May 6, 1941.  J. P. BURKE  2,241,180
PLASTIC INJECTION INLAY METHOD
Filed Nov. 10, 1938
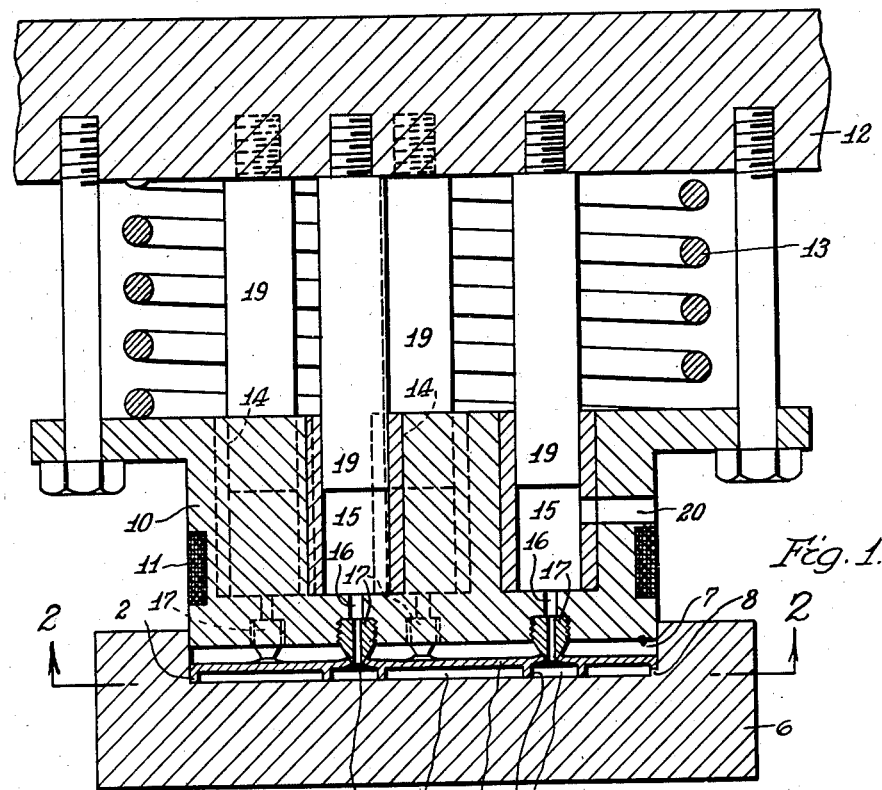
Fig. 1.
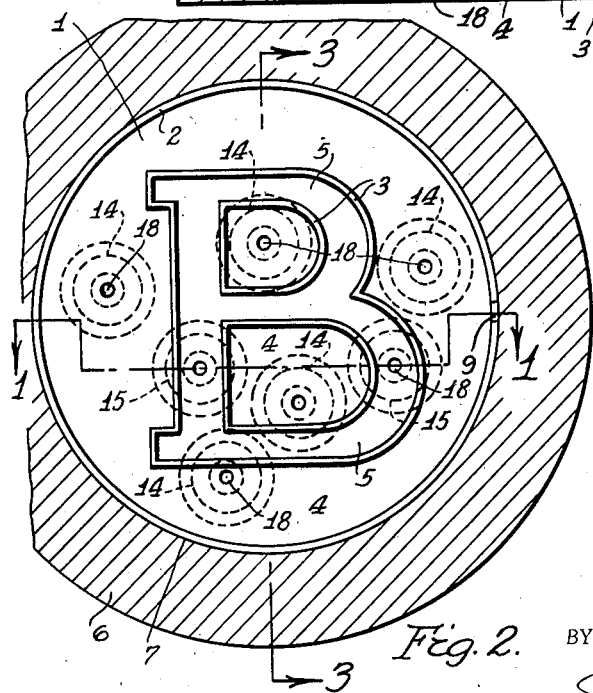
Fig. 2.
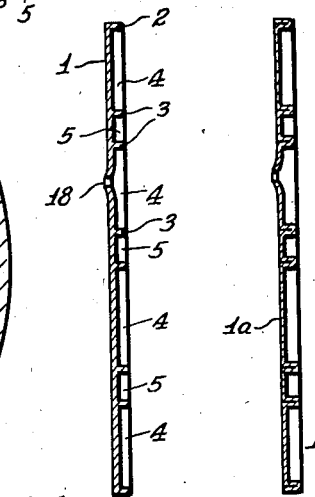
Fig. 3.
Fig. 4.
INVENTOR.
James P. Burke
BY
J. Windsor Davis
ATTORNEY.

Patented May 6, 1941

2,241,180

UNITED STATES PATENT OFFICE 2,241,180

PLASTIC INJECTION INLAY METHOD

James P. Burke, Knoxville, Tenn., assignor of one-half to F. L. McLaughlin, Detroit, Mich.

Application November 10, 1938, Serial No. 239,858

2 Claims. (Cl. 18—61)

This invention relates to the method of injection inlay molding and its application to emblems, nameplates, molding strips, hub caps, vanity cases, etc., and particularly concerns the method of and the means for forming such articles with indicia and backgrounds of contrasting and ornamental colors.

The primary object is to provide a method of forming an article consisting of metal and plastics, the metal comprising a base having indicia outlined thereon in such manner as to form cavities, the cavities being filled with plastics of different colors. The plastics may be of colors selected with a view to providing a contrast between the indicia and its background, or for providing an ornamental or decorative effect.

Another and equally important object is to provide a method of forming articles of the character above mentioned wherein a plurality of differently colored plastics are injected simultaneously or progressively into the cavities of a preformed metal blank. To this end, the blank is supported by means which closes the openings of the cavities, and the plastics are injected from the rear of the blank, through ports therein, into the cavities. The blanks are previously treated with a bonding material in order that the plastics will adhere thereto, whereas the means which closes the cavities is so prepared that the plastics will not adhere thereto.

With the above and other ends in view the invention is more fully disclosed with reference to the accompanying drawing, in which Fig. 1 is a vertical section taken on the line 1—1 of Fig. 2;

Fig. 2 is a transverse section taken on the line 2—2 of Fig. 1;

Fig. 3 is a transverse section taken on the line 3—3 of Fig. 2; and

Fig. 4 is a section illustrating a modified blank construction.

A metal blank 1, formed as a die-casting, or a stamping, has a marginal wall 2 and indicia outlining walls 3 coacting to form cavities 4 and 5. The cavities 4 represent the background of the indicia, the cavity 5 represents the indicia and the two sets of cavities are to be filled with plastics of different colors for ornamental purposes, or for providing a contrast between the indicia and its background. The invention contemplates the injection of the differently colored plastics simultaneously or progressively into their respective cavities.

A base 6 has a recess 7 in which the blank 1 is inserted, there being a projection 8 extending into the recess and engaging in a notch 9 in the blank to locate the blank. Prior to this insertion, the walls of the cavities 4 and 5 are treated with a material which provides a bond between the metal of the blank and the plastics to be used. In some cases where the blank is other than round in shape no locating means is required. The bottom wall of the recess 7 is shaped in such manner that the marginal and defining walls 2 and 3 of the blank uniformly contact the same, and it functions to close the several cavities. In the illustration, the marginal walls 2 and 3 all terminate in the same plane, in which case the bottom wall of the recess 7 is a plane surface, but the bottom wall may, of course, take different shapes depending on the shape of the blank.

A cylinder block 10, provided with heating means 11, is supported by a movable head 12 and is resiliently held spaced from the head 12 by a spring 13. The cylinder block 10 has a plurality of cylinders 14 and 15 and ports 16 leading therefrom to nozzles 17 which contact the walls of ports 18 in the blank. The cylinders 14 and 15 are arranged so that the cylinders 14 communicate with the cavities 4 and the cylinders 15 communicate with the cavity 5.

In each of the cylinders 14 and 15 is a plunger 19 connected to the head 12, and in operation the head 12 is lowered to position the lower end of the block 10 in the recess 7 and the several nozzles 17 in contact with the several ports 18. Further lowering of the head 12, with the block 10 now stationary, causes the plungers 19 to move relative to the cylinders 14 to expel plastic material therefrom to inject it into the cavities 4 and 5.

The cylinders 14 are charged with plastics of a color different from the plastics in the cylinders 15, and therefore the cavities 4 are filled with plastics of one color while the cavity 5 is filled with plastics of another color.

Although the mechanism is not shown, it is contemplated that the cylinders will be automatically charged after each pressure stroke. To admit the plastic charge the cylinders may have inlet ports, such as the one shown at 20 in Fig. 1, which are uncovered when the piston is raised so that plastic tablets may be inserted therein.

It is apparent that the amount of plastic discharged from any cylinder may be regulated by varying the amount supplied thereto. For example, with a known amount of plastic required to fill a given cavity, tablets equalling the amount required are inserted in the cylinders after the pressure strokes of their respective pistons.

The ports 18 in the blank are preferably slightly raised with respect to the plane of the rear wall of the blank, to afford a better seat for the nozzles 17.

As shown in Fig. 4, the blank 1a may be formed of sheet metal stamped and pressed by dies to provide the desired shape and indicia.

In the illustration the indicia and background is such that only two different colors are required. It is obvious, however, that the indicia and background may be such as to require more than two colors. This is possible inasmuch as any practical number of cylinders may be provided in the head 10, and any desired number of different colors may be used. Regardless of the number of colors, however, they are all injected simultaneously into the cavities of the blank.

Although a specific embodiment of the invention is illustrated and described, it will be understood that various changes may be made within the scope of the appended claims without departing from the spirit of the invention, and such changes are contemplated.

What is claimed is:

1. The method which consists in providing a blank with cavities in one side and ports extending from the other side thereinto, and flowing differently colored plastics into different cavities through respective ports.

2. The method which consists in providing a blank with cavities in one side and ports extending from the other side thereinto, closing the cavities, and simultaneously injecting differently colored plastics into different cavities through respective ports.

JAMES P. BURKE.